(12) United States Patent
Shin et al.

(10) Patent No.: US 7,834,083 B2
(45) Date of Patent: Nov. 16, 2010

(54) NANOCOMPOSITE COMPOSITION COMPRISING TRANSPARENT NANOPARTICLES

(75) Inventors: Hyeon Jin Shin, Yongin-si (KR); Jae Young Choi, Yongin-si (KR); Seong Jae Choi, Yongin-si (KR); Seon Mi Yoon, Yongin-si (KR)

(73) Assignee: Samsung Electro-Mechanics Co., Ltd. (KR)

( * ) Notice: Subject to any disclaimer, the term of this patent is extended or adjusted under 35 U.S.C. 154(b) by 382 days.

(21) Appl. No.: 11/748,345

(22) Filed: May 14, 2007

(65) Prior Publication Data
US 2008/0090947 A1    Apr. 17, 2008

(30) Foreign Application Priority Data
Oct. 11, 2006   (KR) .................. 10-2006-0098821

(51) Int. Cl.
C08G 77/22    (2006.01)
C08G 77/26    (2006.01)
C08G 77/28    (2006.01)
C08G 77/30    (2006.01)
C08L 83/04    (2006.01)
C08L 83/08    (2006.01)

(52) U.S. Cl. .................. 524/588; 528/30; 528/38; 528/41; 524/268; 524/432; 524/437; 524/441

(58) Field of Classification Search .................. 524/588
See application file for complete search history.

(56) References Cited

U.S. PATENT DOCUMENTS

| | | | | |
|---|---|---|---|---|
| 4,245,079 A | * | 1/1981 | Matsumoto et al. ........... | 528/15 |
| 4,252,933 A | * | 2/1981 | Sumida ...................... | 528/33 |
| 4,297,145 A | * | 10/1981 | Wolff et al. .................. | 106/475 |
| RE34,804 E | * | 12/1994 | Lachman et al. ............. | 502/64 |
| 5,432,218 A | * | 7/1995 | Mikami et al. ............... | 524/262 |
| 5,872,170 A | * | 2/1999 | Mine et al. ................... | 524/440 |
| 6,515,094 B2 | * | 2/2003 | Czech et al. .................. | 528/12 |
| 6,617,038 B2 | * | 9/2003 | Sakurai et al. ............... | 428/447 |
| 6,630,745 B1 | * | 10/2003 | Osada et al. .................. | 257/793 |
| 6,645,638 B2 | * | 11/2003 | Fujiki et al. .................. | 428/447 |
| 6,713,586 B2 | * | 3/2004 | Greene ........................ | 528/34 |
| 6,887,932 B2 | * | 5/2005 | Azechi ........................ | 524/492 |
| 7,074,849 B2 | * | 7/2006 | Nakayoshi et al. .......... | 524/588 |
| 2003/0158295 A1 | * | 8/2003 | Fukuda et al. ............... | 523/216 |
| 2003/0234074 A1 | * | 12/2003 | Bhagwagar .................. | 156/325 |
| 2005/0148721 A1 | * | 7/2005 | Tonapi et al. ................ | 524/492 |
| 2005/0271884 A1 | * | 12/2005 | Ahn et al. .................... | 428/446 |
| 2006/0100336 A1 | * | 5/2006 | Fukui .......................... | 524/430 |
| 2006/0105480 A1 | * | 5/2006 | Boardman et al. ............ | 438/22 |
| 2006/0254712 A1 | * | 11/2006 | Soliz et al. ................. | 156/307.3 |
| 2006/0276584 A1 | * | 12/2006 | Todoroki et al. ............. | 524/588 |
| 2007/0036962 A1 | * | 2/2007 | Sasaki et al. ............... | 428/292.1 |
| 2008/0293976 A1 | * | 11/2008 | Olah et al. ................... | 568/698 |

* cited by examiner

Primary Examiner—Randy Gulakowski
Assistant Examiner—Robert Loewe
(74) Attorney, Agent, or Firm—Cantor Colburn LLP

(57) ABSTRACT

Disclosed is a nanocomposite composition, comprising transparent nanoparticles, a matrix polymer including a polydimethylsiloxane resin and an epoxy group-containing polydimethylsiloxane resin, and a siloxane dispersant including a head part having an affinity for the transparent nanoparticles and a tail part having an affinity for the polydimethylsiloxane resin. The nanocomposite composition of this invention can be effectively used in the encapsulation layer of a light emitting diode or in an optical film.

13 Claims, 3 Drawing Sheets

NANOCOMPOSITE COMPOSITION COMPRISING TRANSPARENT NANOPARTICLES

This non-provisional application claims priority under U.S.C. §119(a) from Korean Patent Application No. 10-2006-0098821 filed on Oct. 11, 2006, which is hereby incorporated in its entirety by reference.

BACKGROUND OF THE INVENTION

1. Field of the Invention

The present invention relates to a nanocomposite composition comprising optically transparent nanoparticles, and more particularly, to a nanocomposite composition, which comprises optically transparent nanoparticles, a matrix polymer including a polydimethylsiloxane (PDMS) resin and an epoxy group-containing PDMS resin, and a siloxane dispersant including a head part having an affinity for the transparent nanoparticles and a tail part having an affinity for the PDMS resin.

2. Description of the Related Art

As illustrated in FIG. 1, light passing through a first isotropic medium enters a second isotropic medium and undergoes refraction at an interface therebetween. In the FIG. 1, when the incident surface and the refractive surface lie in the same plane and the angles of incidence and refraction are determined to be $\theta_1$ and $\theta_2$, respectively, Snell's law governing the refraction of light provides the relationship of $n_{12}$=sin $\theta_1$/sin $\theta_2$=$n_2/n_1$. Here, "$n_{12}$" is the refractive index of the medium of refraction relative to the medium of incidence.

According to Snell's law, because the angle of refraction is close to the angle of incidence, the extraction efficiency of light, which is incident in all directions, is increased.

Presently, a matrix polymer used as encapsulants in light emitting diodes (LEDs) or in lenses has a refractive index ranging from about 1.4 to 1.6. Furthermore, commercially available matrix polymers generally have refractive indices in the range of about 1.4 to 1.5.

Thus, although there is a need for an encapsulant having a refractive index of greater than 1.8, it is difficult to obtain an encapsulant having a refractive index of 1.8 or more using a polymer as the polymer matrix. Ultimately, the development of a novel type of encapsulation material capable of maintaining transparency and increasing the refractive index to increase light extraction efficiency is desired.

SUMMARY OF THE INVENTION

It is therefore desirable to have a nanocomposite composition, comprising transparent nanoparticles in order to maintain transparency and increase the refractive index so as to facilitate improved light extraction efficiency.

It is also desirable to provide an encapsulation layer of an LED and an optical film, each formed using the nanocomposite composition comprising transparent nanoparticles to maintain transparency and increase the refractive index so as to improve light extraction efficiency.

The present invention further provides a nanocomposite composition comprising transparent nanoparticles, a matrix polymer including a PDMS resin and an epoxy group-containing PDMS resin, and a siloxane dispersant including a head part having an affinity for the transparent nanoparticles and a tail part having an affinity for the PDMS resin.

DESCRIPTION OF THE PREFERRED EMBODIMENTS

Figure 1:
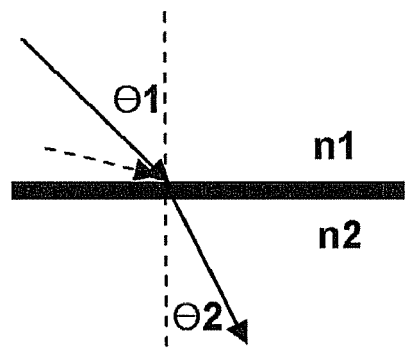
FIG. 1 is a schematic view illustrating Snell's law.

Hereinafter, a detailed description will be given of the present invention with reference to the appended drawings.

The present invention pertains to a nanocomposite composition comprising transparent nanoparticles, a matrix polymer including a PDMS resin and an epoxy group-containing PDMS resin, and a siloxane dispersant including a head part, having an affinity for the transparent nanoparticles, and a tail part having an affinity for the PDMS resin.

The nanocomposite composition of the present invention comprises 1 to about 50 volume percent (vol %) of the transparent nanoparticles, and about 0.1 to about 5 vol % of the siloxane dispersant based on the transparent nanoparticles, with the balance comprising the matrix polymer. All volume percents are based on the total volume of the nanocomposite composition unless otherwise stated.

In the composition of the present invention, the matrix polymer constitutes the remaining amount, with the exception of the transparent nanoparticles and the dispersant. The matrix polymer includes about 75 to about 88 vol % of the PDMS resin and about 12 to about 25 vol % of the epoxy group-containing PDMS resin.

In the composition of the present invention, when the amount of the transparent nanoparticles is less than 1 vol %, no improvement in light extraction efficiency can be expected. On the other hand, when the amount exceeds 50 vol %, transparency cannot be maintained, or the physical properties of the encapsulation layer may be deteriorated due to the presence of haze produced by the increasing amounts of the nanoparticles. In addition, when the dispersant is used in an amount less than 0.1 vol % based on the volume of the transparent nanoparticles, the transparent nanoparticles are not efficiently dispersed and thus may agglomerate, undesirably making it impossible to maintain transparency. On the other hand, when the dispersant is used in an amount exceeding 5 vol % based upon the volume of the transparent nanoparticles, the properties of the composition may be deteriorated by a decrease in the amounts of the other components.

The transparent nanoparticles, included in the composition of the present invention, have a refractive index of 1.4 or more, and preferably about 1.6 to about 1.8, and an optical transparency of 80% or more, and preferably an optical transparency of about 85 to about 95%. Examples of such nanoparticles include, but are not limited to, zirconia ($ZrO_2$), titania ($TiO_2$), and zinc sulfide (ZnS). Any material may be used without limitation as long as it satisfies the above refractive index and transparency.

The nanoparticles generally have a size of about 0.5 to about 100 nanometers, preferably about 5 to about 75 nanometers, and more preferably 10 to about 50 nanometers.

The siloxane dispersant, used in the composition of the present invention, includes a head part selected from the group represented by Formula 1 or 2 below and a tail part selected from the group represented by Formula 3 below:

Formula 1

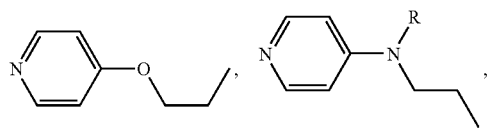

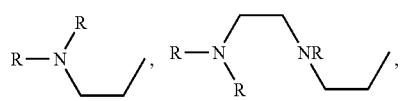

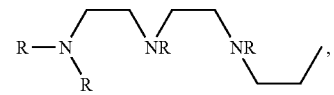

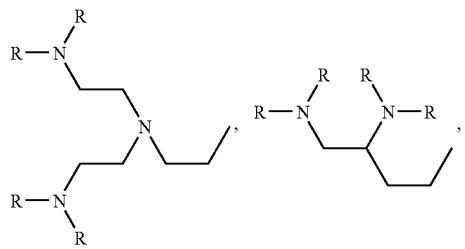

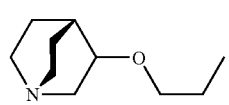

wherein R is hydrogen or a $C_{1-4}$ alkyl group;

Formula 2

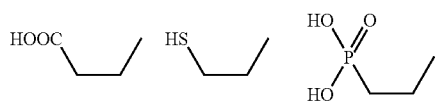

Formula 3

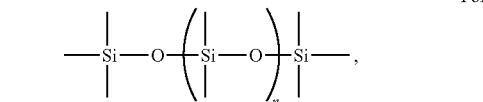

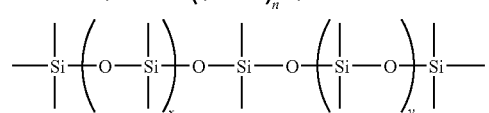

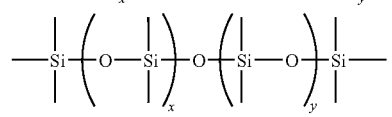

wherein n is an integer from about 2 to about 30, and x and y are each independently an integer from about 2 to about 20.

That is, the dispersant used in the composition of the present invention has the head part selected from the group represented by Formula 1 or 2, such that a lone pair of electrons present in the head part may easily form a coordinate bond with the metal ions of the surface of the nanoparticles. Further, the dispersant of the present invention has the PDMS-based tail part selected from the group represented by Formula 3, to thus increase the affinity for the PDMS resin as a dispersion medium.

Specifically, preferable examples of the dispersant are represented by Formulas 4 to 28 below:

Formula 4

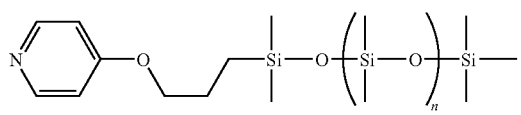

Formula 5

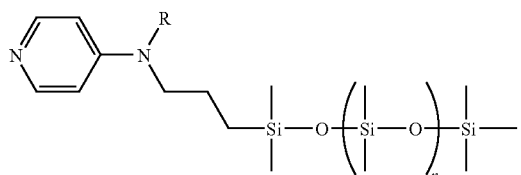

Formula 6

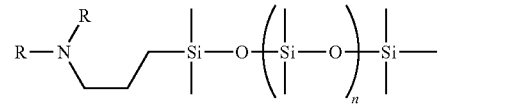

Formula 7

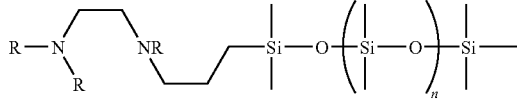

Formula 8

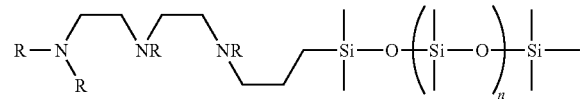

Formula 9

Formula 10

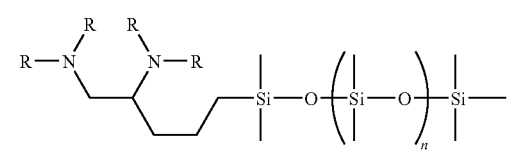

Formula 11
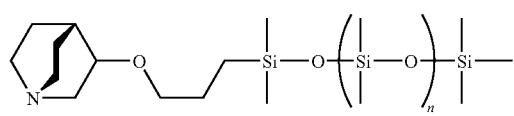
Formula 12
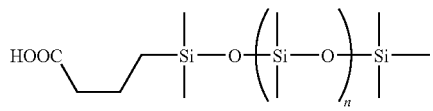
Formula 13
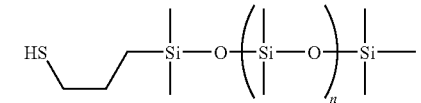
Formula 14
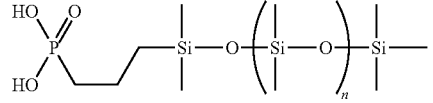
Formula 15
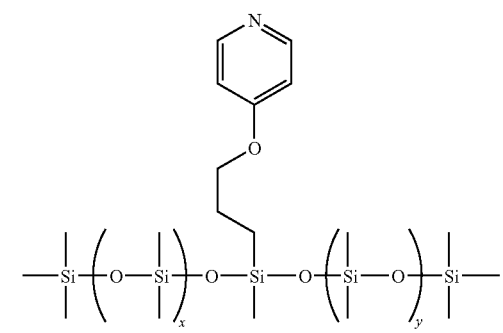
Formula 16
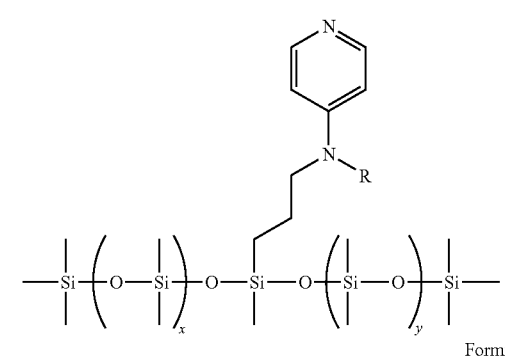
Formula 17
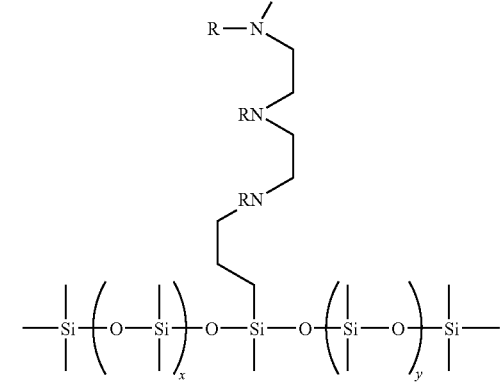
Formula 18
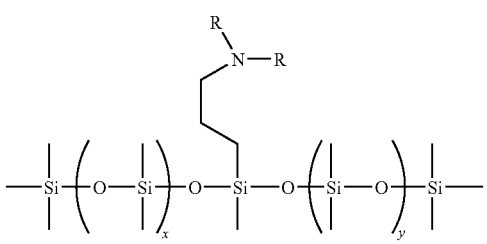
Formula 19
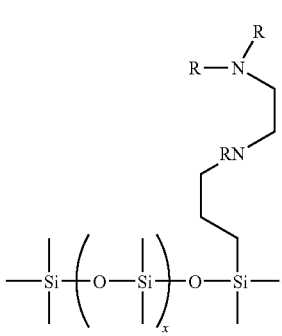
Formula 20
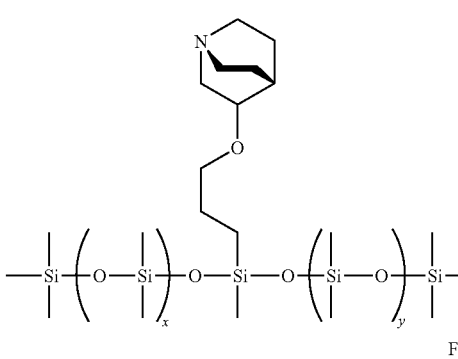
Formula 21
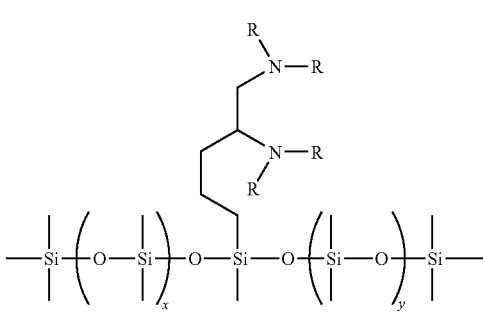
Formula 22
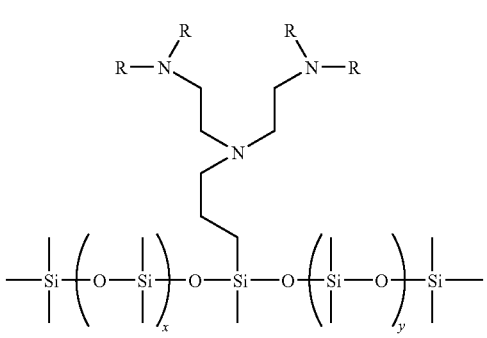

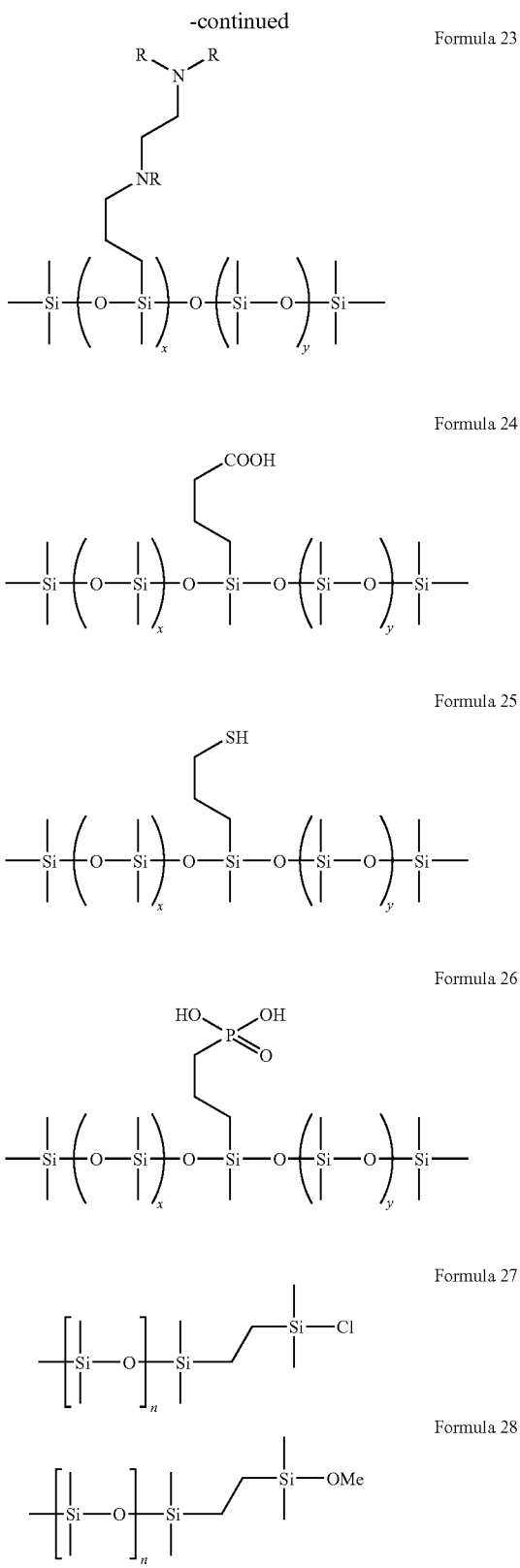

Formula 23

Formula 24

Formula 25

Formula 26

Formula 27

Formula 28 in Formulas 4 to 28, R is hydrogen or a $C_{1-4}$ alkyl group, n is an integer from about 2 to about 40, and x and y are each independently an integer from about 2 to about 40.

Examples of the PDMS resin used in the present invention include typical PDMS and derivatives thereof.

Furthermore, the epoxy group-containing PDMS resin of the present invention is included as a curing agent in the composition of the present invention. When the composition is heated, a chemical bond with the PDMS resin may be formed by the ring-opening effect of the epoxy group, therefore resulting in a cured composition.

The epoxy group-containing PDMS resin is specifically represented by Formula 29 below:

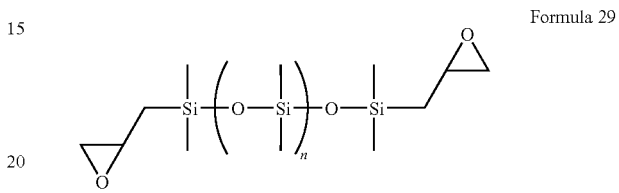

Formula 29 wherein n is an integer from 2 to 30.

In addition, the present invention provides an encapsulation layer of an LED and an optical film, each formed using the nanocomposite composition mentioned above.

Figure 5:
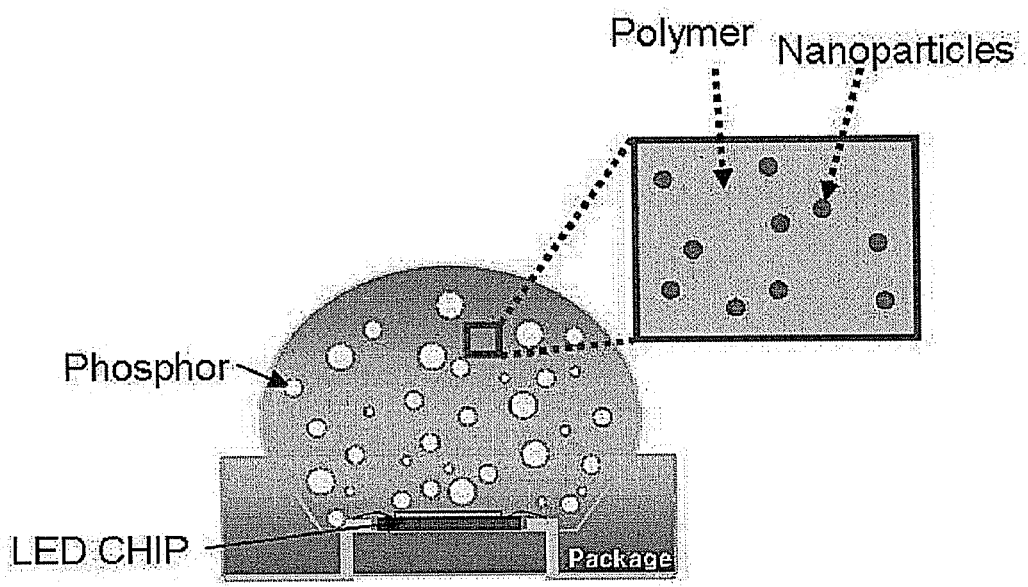
FIG. 5 is a schematic view illustrating the structure of a white LED having an encapsulation layer, according to the present invention.

The encapsulation layer of the diode and the optical film may be respectively manufactured using the above-mentioned composition through a typical process, that is, a coating process such as spin coating, and a curing process. FIG. 5 illustrates the schematic structure of a white LED comprising the encapsulation layer formed in the present invention.

As illustrated in FIG. 5, the white LED may be manufactured by enclosing a blue LED chip disposed on a lead frame with a phosphor and transparent nanoparticles and encapsulating a matrix polymer, wires and a lead frame with the nanocomposite composition of the present invention.

Also, the optical film may be manufactured through a typical process, including subjecting the nanocomposite composition of the present invention to a series of applications on a flat surface, drying, heating to a glass transition temperature (Tg) of a polymer, and then drawing.

A better understanding of the present invention may be obtained in light of the following examples which are set forth to illustrate, but are not to be construed to limit the present invention.

EXAMPLE 1

Preparation of Nanocomposite Composition (1)

According to the components shown in Table 1 below, 1500 microliters (μl) of a toluene solution containing 10 weight percent (wt %) $ZrO_2$ was mixed with 5 μl of a dispersant (Si37-$NH_2$) represented by Formula 30 below and, as a matrix polymer, 20 μl of a compound (SiP—$NH_2$) represented by Formula 31 below and 7 μl of an epoxy group-containing PDMS resin (Trade Name: Epoxypropoxypropyl Terminated Polydimethylsiloxane, available from Gelest) represented by Formula 29, thus preparing a nanocomposite composition comprising 20.8 vol % $ZrO_2$.

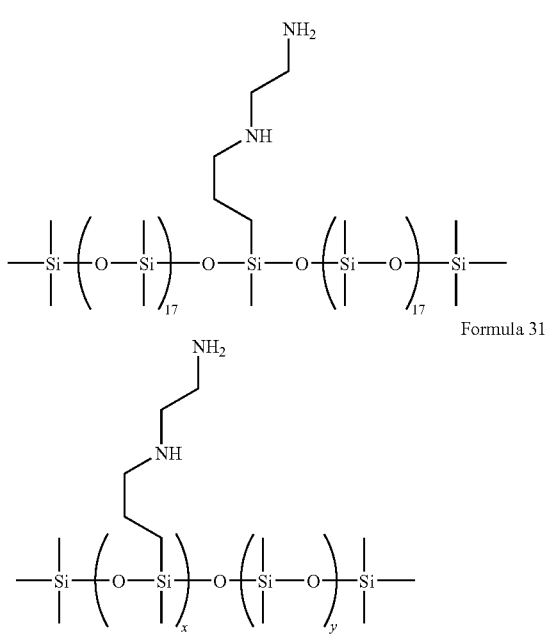

Formula 30

Formula 31 wherein x is 1 and y is 18.

EXAMPLE 2

Preparation of Nanocomposite Composition (2)

A nanocomposite composition comprising 14.5 vol % $ZrO_2$ was prepared in the same manner as in Example 1, with the exception that the toluene solution containing 10 wt % $ZrO_2$ was used in an amount of 500 μl, as shown in Table 1 below.

EXAMPLE 3

Preparation of Nanocomposite Composition (3)

A nanocomposite composition comprising 4.0 vol % $ZrO_2$ was prepared in the same manner as in Example 1, with the exception that the toluene solution containing 10 wt % $ZrO_2$ was used in an amount of 120 μl, as shown in Table 1 below.

COMPARATIVE EXAMPLE

A nanocomposite composition comprising no $ZrO_2$ was prepared in the same manner as in Example 1, with the exception that the toluene solution containing no $ZrO_2$ was used in an amount of 500 μl, as shown in Table 1 below.

TABLE 1

| No. | $ZrO_2$ (vol %) | $ZrO_2$ (μl) | Toluene (μl) | $ZrO_2$ (μl) | Si37—$NH_2$ (Dispersant) | SiP—$NH_2$ (Matrix) | Epoxy (Matrix) |
|---|---|---|---|---|---|---|---|
| Ex. 1 | 20.8 | 1500 | 0 | 1500 | 5 | 20 | 7 |
| Ex. 2 | 14.5 | 500 | 0 | 500 | 5 | 20 | 7 |
| Ex. 3 | 4.0 | 120 | 0 | 120 | 5 | 20 | 7 |
| C.Ex. | 0.0 | 0 | 500 | 0 | 5 | 20 | 7 |

EXPERIMENTAL EXAMPLE

Refractive Index and Transmittance of Thin Film and Dispersibility of $ZrO_2$ Particles in Thin Film The composition prepared in each of Examples 1 and 2 and Comparative Example was applied through spin coating on a silicon wafer and quartz and then cured at 150° C. for 1 hour, thus forming a thin film.

Using an ellipsometer, the thickness of the thin film was measured, and the refractive index thereof was measured. The results are shown in Table 2 below and in FIG. 2, in which the calculated value is obtained from the refractive index (2.2) of $ZrO_2$×vol %+the refractive index (1.4) of PDMS×vol %.

Figure 2:
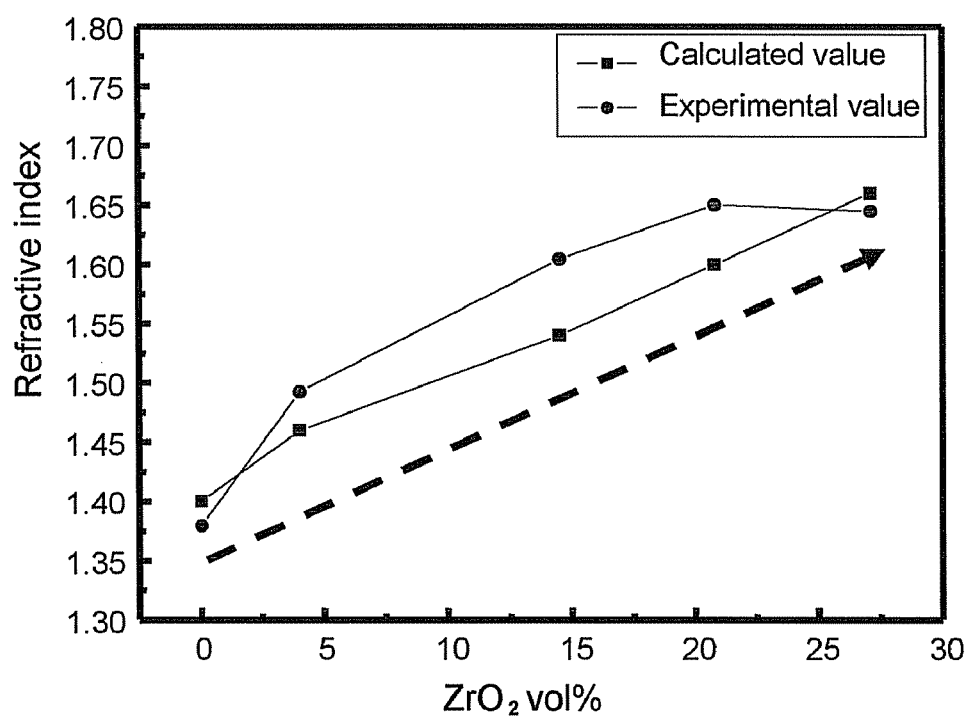
FIG. 2 is a graph illustrating the improvement effect on the refractive index of the nanocomposite composition according to the present invention.

As is apparent from Table 2 below, the thin film, containing the $ZrO_2$ of Example 1, had a refractive index of 1.65, which was increased by 20% over the index of 1.38 of the thin film of Comparative Example. Further, as shown in FIG. 2, the calculated value and the actual experimental value of the refractive index were very close to each other.

Figure 3:
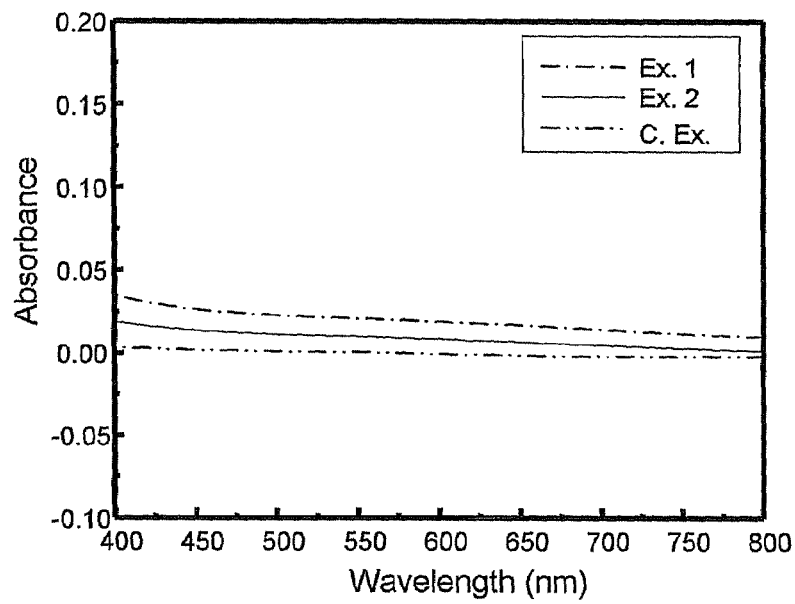
FIG. 3 is a UV spectrum illustrating the transmittance that is maintained by the nanocomposite composition according to the present invention.

In addition, the transmittance was measured using a UV spectrometer. The results are shown in FIG. 3. As in FIG. 3, it can be seen that the optical transparency of the composition of Examples 1 and 2 was maintained.

Figure 4:
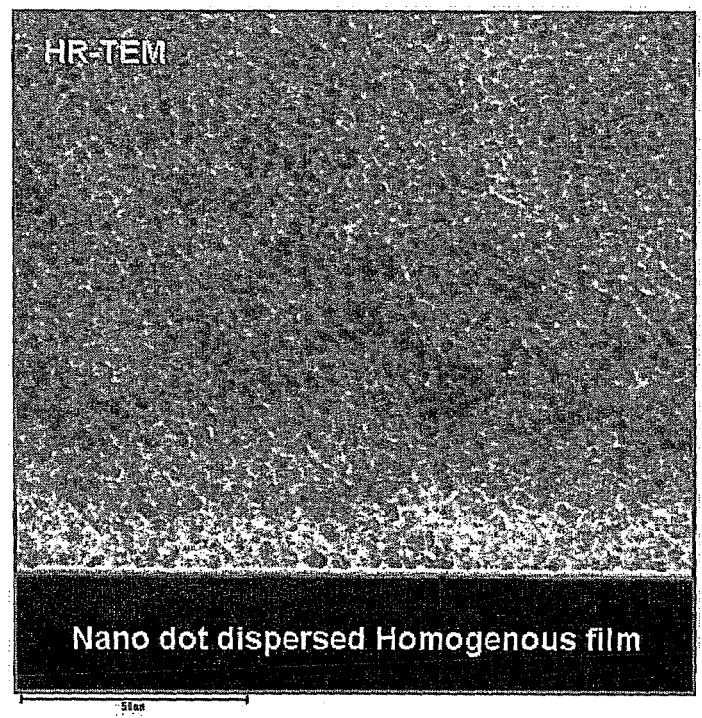
FIG. 4 is a photograph illustrating the degree of dispersion of the nanocomposite composition according to the present invention, observed using a transmission electron microscope (TEM)

In addition, using a TEM, the degree of dispersion of $ZrO_2$ particles of the composition of Example 1 in the thin film was observed. The result is shown in FIG. 4. As in FIG. 4, it can be seen that $ZrO_2$ particles were uniformly distributed without aggregation.

TABLE 2

| No. | $ZrO_2$ (vol %) | Thickness (Å) | Refractive Index (Experiment.) (@633 nm) | Refractive Index (Cal.) |
|---|---|---|---|---|
| Ex. 1 | 20.8 | 2589 | 1.6501 | 1.60 |
| Ex. 2 | 14.5 | 3902 | 1.6047 | 1.54 |
| Ex. 3 | 4.0 | 3167 | 1.4925 | 1.46 |
| C. Ex. | 0.0 | 1380 | 1.3795 | 1.4 |

As described hereinbefore, the present invention provides a nanocomposite composition comprising transparent nanoparticles. According to the present invention, a nanocomposite composition can increase the refractive index while maintaining transparency, thereby realizing excellent light extraction efficiency. Therefore, the nanocomposite composition of the present invention can be effectively applied to an encapsulation layer of an LED and an optical film.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A nanocomposite composition, comprising: phosphors, optically transparent nanoparticles, a matrix polymer including a polydimethylsiloxane resin and an epoxy group-containing polydimethylsiloxane resin, and a siloxane dispersant including a head part having an affinity for the nanoparticles and a tail part having an affinity for the polydimethylsiloxane resin.

2. The composition as set forth in claim 1, which comprises about 1 to about 50 volume percent of the nanoparticles, and about 0.1 to about 5 volume percent of the siloxane dispersant based on the volume of the nanoparticles, with a balance of the matrix polymer.

3. The composition as set forth in claim 2, wherein the matrix polymer comprises about 75 to about 88 volume percent of the polydimethylsiloxane resin and about 12 to about 25 volume percent of the epoxy group-containing polydimethylsiloxane resin.

4. The composition as set forth in claim 1, wherein the nanoparticles have a refractive index of 1.4 or more.

5. The composition as set forth in claim 1, wherein the nanoparticles have an optical transparency of 80% or more.

6. The composition as set forth in any one of claims 1 to 5, wherein the nanoparticles are selected from a group consisting of zirconia ($ZrO_2$), titania ($TiO_2$), and zinc sulfide (ZnS).

7. The composition as set forth in claim 1, wherein the siloxane dispersant comprises the head part selected from a group represented by Formula 1 or 2 below and the tail part selected from a group represented by Formula 3 below:

Formula 1

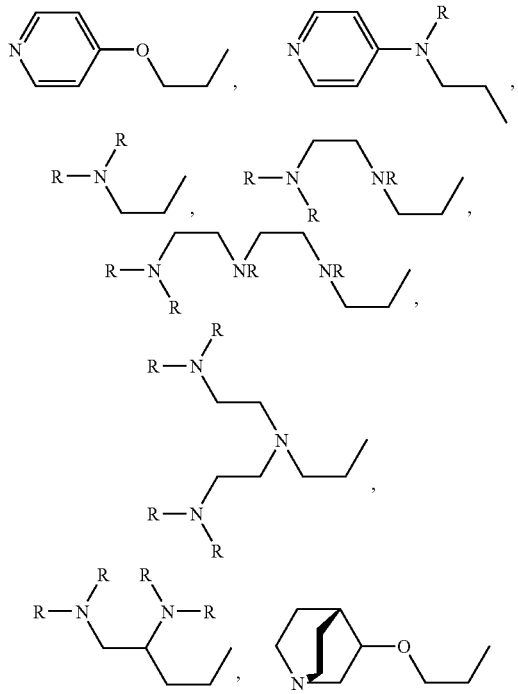

wherein R is hydrogen or a $C_{1-4}$ alkyl group;

Formula 2

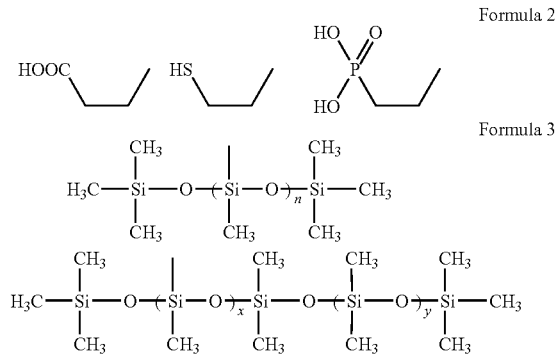

Formula 3

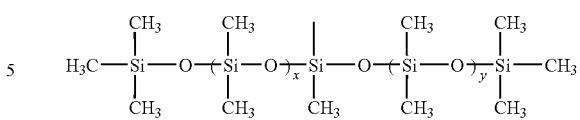

-continued

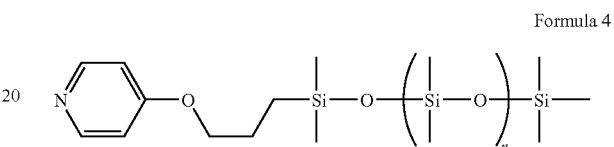

Wherein n is an integer from about 2 to about 30, and x and y are each independently an integer from about 2 to about 20.

8. The composition as set forth in claim 7, wherein the dispersant is any one compound selected from a group represented by Formulas 4 to 28 below:

Formula 4

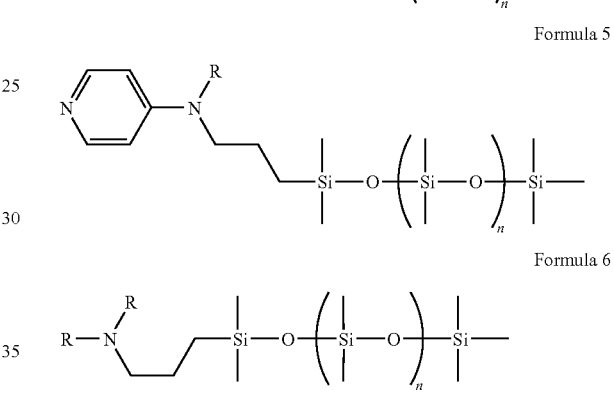

Formula 5

Formula 6

Formula 7

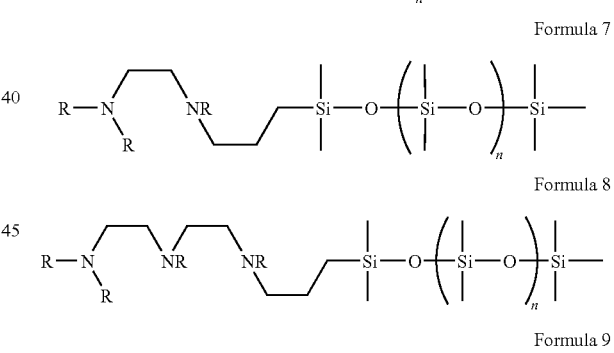

Formula 8

Formula 9

Formula 10

-continued
Formula 11
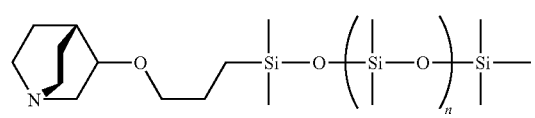
Formula 12
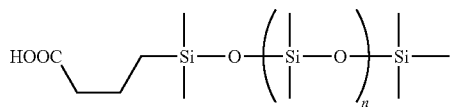
Formula 13
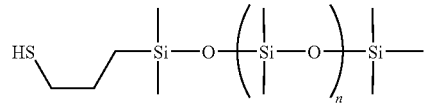
Formula 14
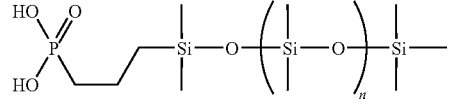
Formula 15
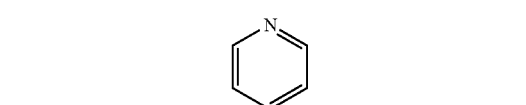
Formula 16
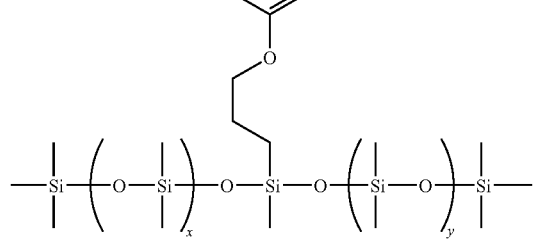
Formula 17
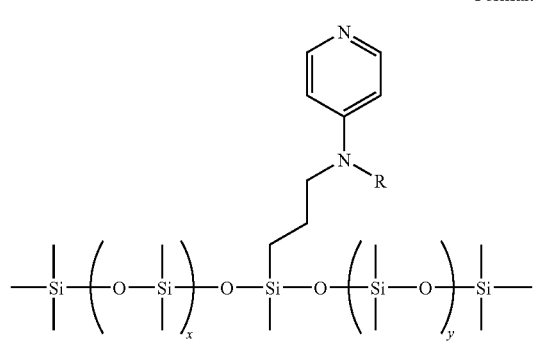
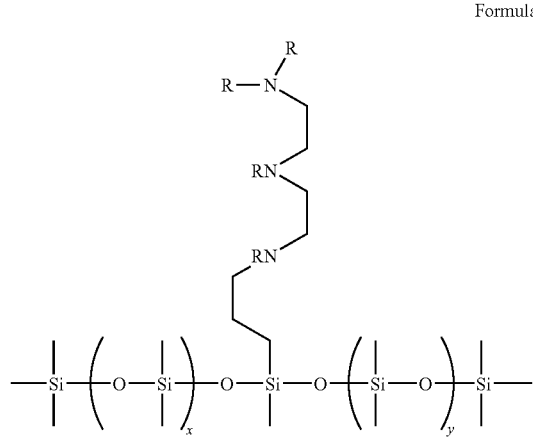
Formula 18
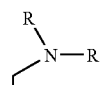
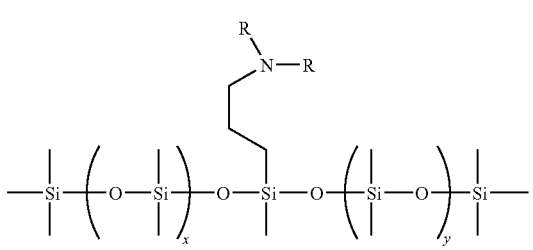
Formula 19
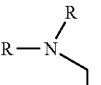
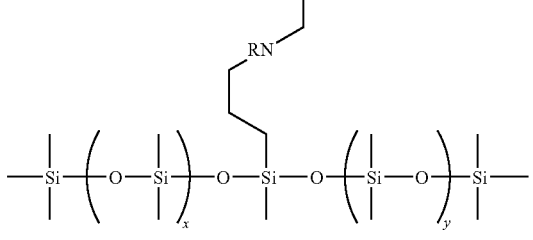
Formula 20
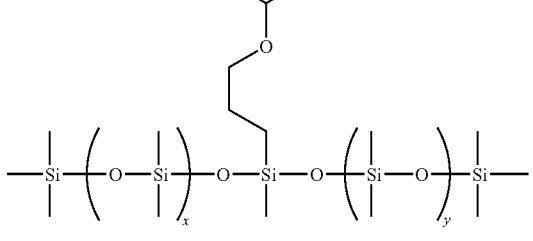
Formula 21
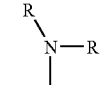
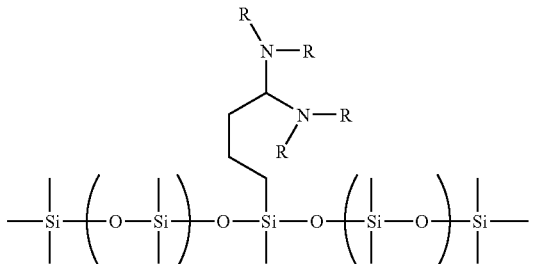
Formula 22
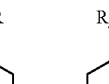
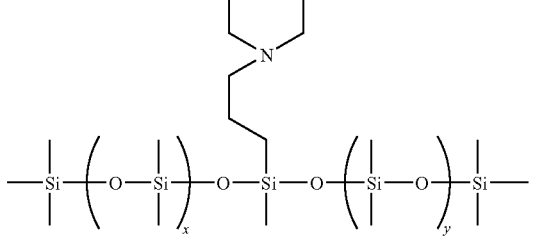

-continued

Formula 23

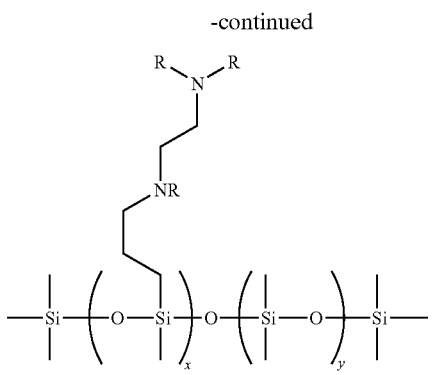

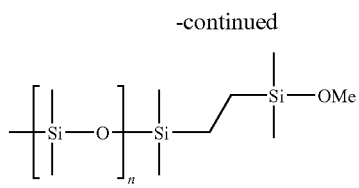

Formula 28 in Formulas 4 to 28, R is hydrogen or a $C_{1-4}$ alkyl group, n is an integer from about 2 to about 40, and x and y are each independently an integer from about 2 to about 40.

9. The composition as set forth in claim 1, wherein the epoxy group-containing polydimethylsiloxane resin is represented by Formula 29 below:

Formula 24

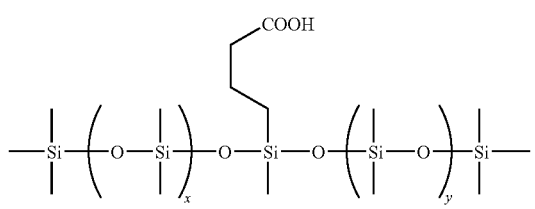

Formula 29

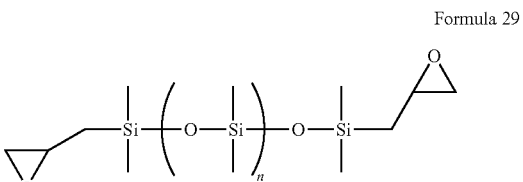

wherein n is an integer from about 2 to about 30.

10. An encapsulation layer of a light emitting diode, formed using the nanocomposite composition of claim 1.

11. An optical film, formed using the nanocomposite composition of claim 1.

12. A method comprising: blending phosphors, optically transparent nanoparticles, a matrix polymer that comprises a polydimethylsiloxane resin and an epoxy group-containing resin, and a siloxane dispersant including a head part having an affinity for the nanoparticles and a tail part having an affinity for the polydimethylsiloxane resin; reacting the head part to the nanoparticles; and reacting the tail part to the polydimethylsiloxane resin.

13. A method of manufacturing a light emitting diode comprising:
preparing a light emitting diode chip;
disposing on the light emitting diode chip a nanocomposite composition comprising a phosphor, optically transparent nanoparticles, a matrix polymer that comprises a polydimethylsiloxane resin and an epoxy group-containing resin, and a siloxane dispersant including a head part having an affinity for the nanoparticles and a tail part having an affinity for the polydimethylsiloxane resin; reacting the head part to the nanoparticles; and reacting the tail part to the polydimethylsiloxane resin; and
curing the nanocomposite composition.

Formula 25

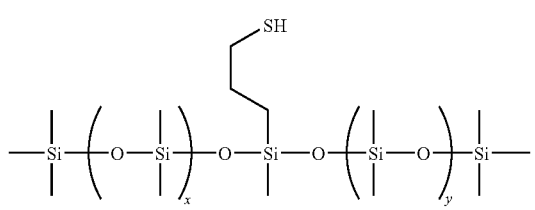

Formula 26

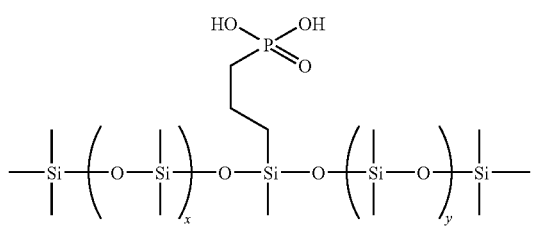

Formula 27

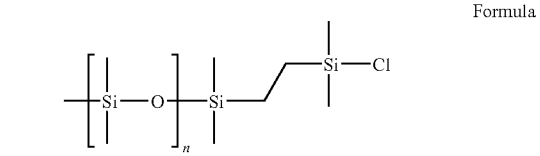

* * * * *